United States Patent Office 2,851,369
Patented Sept. 9, 1958

2,851,369

POLISHING COMPOSITION

Henry C. Geen, Grand Rapids, Mich., assignor to Simoniz Company, a corporation of Delaware No Drawing. Application May 31, 1956
Serial No. 588,221

10 Claims. (Cl. 106—10)

This invention relates to a polishing composition adapted to be applied to a surface and then wiped or buffed to a high luster.

One popular type of polishing composition includes a solvent, a surface coating material adapted to be deposited on a surface upon evaporation of the solvent after application of the composition to the surface, with the surface coating material or mixture of materials being both dissolved in the solvent and dispersed therein. Where the amount of solvent is relatively small, the polishing composition may be in the form of a paste. Even here, the amount of solvent is usually quite large in relation to the other ingredients. Where the amount of solvent is relatively large, the polishing composition will ordinarily be in the form of a liquid.

In all such polishing compositions, whether of paste-like nature or liquid, there is usually an insoluble constituent or constituents included in the surface coating material or materials present. There is a distinct problem in the liquid polishing composition in preventing these solids, which are usually in the form of separate particles at the time of preparation, from settling and packing to a solid mass or agglomerates that cannot be readily redispersed by shaking the container or otherwise agitating the composition. In paste compositions the problem is to obtain uniform paste consistencies at relatively low solids contents.

The surface coating compositions of this invention successfully avoid these problems by providing a thixotropic composition in which the solid particles, in the case of a liquid composition, do not pack to the point where they are difficulty redispersible and, in the case of a paste composition, by producing a desired consistency at low solids content.

One of the features of this invention, therefore, is to provide a thixotropic substantially non-aqueous surface coating composition comprising a liquid phase including a non-aqueous solvent, a surface coating material adapted to be deposited on a surface upon evaporation of the solvent after application of the composition to the surface, and a compound substantially insoluble in the solvent at room temperature having essentially the formula

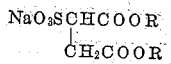

wherein R is a member of the class consisting of n-octyl and 2-p-tertiarybutylphenoxyethyl groups.

Other features and advantages of the invention will be apparent from the following description of certain embodiments thereof.

The above described esters of sodium sulfosuccinic acid, when used in a non-aqueous solvent in a surface coating composition and in which the esters are substantially insoluble at room temperature, produce a thixotropic composition which can easily be agitated to form a liquid, and which permit the dispersed but settled solids to be easily redispersed upon agitation of the liquid composition. When less solvent is used than is employed in making the liquid compositions, the esters function to provide paste consistencies at lower than usual solids content. In the preferred liquid coating composition of this invention, the surface coating material includes a wax both dissolved and dispersed in the non-aqueous solvent. The dispersed particles of wax are in the form of small discrete particles that on standing tend to settle out. However, because of the presence of the ester and the thixotropic nature of the composition, these particles do not pack into a difficulty dispersible solid mass or agglomerates, but are easily redispersed by shaking the container holding the liquid polishing composition.

If desired, a similar composition may be used in producing a paste type surface coating composition, except here the amount of non-aqueous solvent is reduced to a point where the product sets up as a paste. Such products and their preparation are well known to those skilled in the art. In the case of a paste, the thixotropic compositions of this invention permit achieving the same paste-like consistency by using less solids and, thus, a higher proportion of solvent than is used when the above described esters of sodium sulfosuccinic acid are absent.

In general, the amount of the di-(n-octyl)ester of sodium sulfosuccinic acid or the di-(2-p-tertiarybutylphenoxyethyl)ester of sodium sulfosuccinic acid used in the surface coating compositions of this invention is between about 0.1–10% by weight of the composition. An especially preferred and optimum range is about 0.5–1.0%. In a liquid polishing composition employing a non-aqueous solvent and a wax along with other conventional ingredients, the preferred amounts of solvent and wax is about 78 parts by weight of a non-aqueous solvent and about 0.75–7.25 parts by weight of a wax. Such a composition, which may be prepared according to the method set out in the copending application of P. E. Wenaas and C. S. Miner, Jr., application Serial No. 569,691, filed March 6, 1956, and assigned to the same assignee as the present application, also may contain from about 0.5–5.45 parts by weight of a liquid silicone in addition to the 78 parts solvent and about 0.75–7.25 parts wax. In such a composition, including the solvent and wax, a portion of the wax is undissolved and in the form of small discrete particles. These particles apparently aid in obtaining a smooth, uniform coating of the polish and the wax on the treated surface.

One method of preparing a liquid polishing composition such as the liquid polishing composition of this invention is that described in detail in the above copending Wenaas and Miner application. In this method, about 4 to about 93%, and preferably from about 7 to about 37%, of the non-aqueous solvent is first heated and the melted wax is added to the heated solvent to produce a wax concentrate solution. The temperature of this concentrate is preferably maintained between about 130–200° F. with the preferred temperature being about 5–10° F. above the minimum temperature required to keep the wax in solution. The amount of solvent in the concentrate and the temperature of the concentrate should be sufficient to dissolve all of the wax. Preferably, the concentrate contains about 1.1–4.2 pounds of wax per gallon of concentrate.

This heated concentrate is then added to the remaining portion of the solvent while this remaining portion is maintained at a fixed temperature that is preferably between about 35–90° F. and that preferably does not vary over about 5° F. during the addition of the concentrate. During the addition the mixture is gently stirred so as to obtain thorough mixing without excessive agitation.

As the concentrate is thusly added to the cooled solvent, the insoluble constituents of the wax precipitate and fine, substantially uniform, particles are produced. This composition, when used in a polish, produces a liquid polish that is easy to apply and that covers the surface substantially uniformly.

When the silicone fluid is used in the polishing composition, this silicone may be added at any point in the above described process.

In the preferred method when the solvent is a hydrocarbon mineral spirit, the wax is an oxidized microcrystalline wax and the silicone is a dimethylpolysiloxane fluid, the amount of solvent in the concentrate is preferably about 15–17% of the total solvent and the temperature of the cooled solvent and of the mixture of solvent and concentrate during the addition is dependent at least in part on the concentration of the wax in the concentrate. Thus, when the amount of wax in the concentrate is about 2.4–2.7 pounds per gallon, the temperature of the mixture is preferably maintained at about 60° F. When the concentration of wax is relatively small, however, the temperature of the mixture can be less. Thus, where the concentration is about 2.1 pounds of wax per gallon in the concentrate, the temperature is preferably about 57° F.

The amount of solvent used to make the concentrate is quite variable and this amount is controlled primarily by practical considerations. Thus, if too much solvent is used, problems are encountered in reducing the temperature of the remainder of the solvent sufficiently low to maintain the required low final temperature. Thus, such procedures raise refrigeration and heat transfer problems and increase the cost of heating the concentrate. If too small an amount of solvent is used in the concentrate, there is danger of the wax being insufficiently dissolved and it becomes necessary to raise the temperature of the concentrate to an excessively high degree.

In general, about 4% to about 93%, and preferably from about 7% to about 37%, of the total solvent should be used in the concentrate. Where the amount of solvent in the concentrate is at the high end of the range, the temperature of the concentrate should be at the low end of the temperature range. Similarly, when the solvent is at the low end of its range, the temperature should be at the high end of its range.

The preferred solvents are hydrocarbon solvents and specifically naphthas. Among the suitable solvents are Amsco LEP solvent made by American Mineral Spirits Co. and having an initial boiling point of 313° F. and a dry end point of 349° F.; "Amsco Naphthol Mineral Spirits" also made by American Mineral Spirits Co., having an initial boiling point of 307° F. and a dry end point of 337° F.; "Shell 360" solvent made by Shell Oil Company and having an initial boiling point of 310° F. and a dry end point of 355° F.; "Skellysolve S–2" made by Skelly Oil Company and having an initial boiling point of 309° F. and a dry end point of 326° F.; "Amsco Special Naphthol" made by American Mineral Spirits Co. and having an initial boiling point of 310° F. and a dry end point of 349° F.; hexane; octane; isooctane; and V. M. & P. naptha. Other suitable solvents for use with the di-(n-octyl)ester of sodium sulfosuccinic acid are xylene, toluene, and perchlorethylene. In any case, the solvent which is ultimately selected is one in which the ester is not completely soluble at room temperature.

Among the waxes that may be used in this invention are microcrystalline waxes, oxidized microcrystalline waxes, polyethylene, oxidized polyethylene, carnauba, beeswax, hydrogenated castor oil, and mixtures thereof.

A wax that has been found effective is a microcrystalline wax and preferably an oxidized microcrystalline wax. An excellent wax for this purpose is "Crown 23" oxidized microcrystalline wax made by the Bareco Wax Company, a division of Petrolite Corp. of 205 E. 42nd Street, New York 17, New York.

The liquid silicones that may be used in this invention include those containing chains of alkylsiloxane units, especially dialkylsiloxane units, and preferably dimethylpolysiloxane units. These silicones have a viscosity of about 20 to about 1,000,000 centistokes at 100° F. and preferably a viscosity of about 20 to about 1,000 centistokes at 100° F. Especially preferable dimethylpolysiloxanes are "DC–200" and "GE–SF–96," each within a range of about 40 to about 500 centistokes viscosity when measured at 100° F. and made, respectively, by Dow Corning Corporation and General Electric Co. Other suitable silicones include the following: a polysiloxane containing 90% dimethyl groups and 10% methyl phenyl groups identified as "DC–510," polymethylvinylsiloxane identified as "RXF–522," a silicone resin used in conjunction with a dimethylpolysiloxane fluid and which is a methyl phenyl copolymer siloxane containing from about 30 mol percent to about 95 mol percent of trifunctional silicone atoms in which the ratio of methyl to phenyl groups is between 80:20 to 20:80 and identified as "General Electric 81556" (formerly identified as "GE–81531"), a dimethylpolysiloxane of 10,000 centistokes viscosity with the end of the molecule containing a monofunctional polysiloxane group and identified as General Electric "Viscasil 10,000," and methyldichlorophenylpolysiloxane, which is a copolymer containing about 83% of methyl groups and about 17% dichlorophenyl groups with about 3–10% of the polysiloxane being chlorine and identified as "General Electric 81406."

In one example of preparing a polish according to the methods of this invention, 335 pounds of Crown 23 wax were melted at a temperature not exceeding 220° F. The melted wax was added to about 160 gallons of "Amsco Naphthol Mineral Spirits" solvent maintained at a temperature between 150 and 170° F. and the mixture stirred until all the wax had been dissolved. This concentrate was then added to about 840 gallons of Amsco Naphthol Mineral Spirits solvent which was cooled to a temperature of about 57° F. before and during the addition. The concentrate was added in the form of a coarse spray while the cool solvent mixture was gently agitated. Agitation was then continued while the temperature was permitted to raise slowly to room temperature. If desired, any suitable type of dye may be added depending upon the shade of surface upon which the polish is to be used.

The insoluble constituent of the wax in the above polish was found to be contained in the small, discrete, substantially uniform particles that were produced. 70.11 pounds of the di-(n-octyl)ester of sodium sulfosuccinic acid were mixed with 280 pounds of the above polish and the mixture passed through a conventional mixer having a high shear such as a chopper type of mixer to reduce the lumps of the ester to smooth consistency. This mixture was then added to the balance of the above polish and mixed therein, after which 701.1 pounds of Freon 113 was mixed into the combination.

At this point, 209 pounds of GE dimethylpolysiloxane fluid having a viscosity of 300 centistokes at 100° F. were added. The resulting polish, when applied to furniture, wet the surface thoroughly and upon drying formed a substantially uniform coating on the surface. The coating was easily wiped smooth to produce a high luster.

In preparing a paste product, a smaller amount of solvent will be used relative to the dissolved and undissolved materials than is used in preparing liquid products, and it is only necessary to mix the non-aqueous solvent, surface coating material and sodium sulfosuccinic acid ester in the desired proportions. These proportions will be exactly the same as those used in making any paste product, except the amount of solvent can be increased while producing a paste of any desired consistency. All such proportions and methods are well understood by those skilled in the art.

In making a liquid polishing composition of this invention, any of the various halogenated hydrocarbons soluble in naphthas and preferably but not necessarily having a boiling point above 100° F. may be used if desired. These include Freon 113, Freon 114, and the like. The halogenated hydrocarbon is not a necessary ingredient but is used principally to increase the density of the liquid portion of the composition. Where such a halogenated hydrocarbon is employed, it is preferably used in an amount up to about 20% by weight of the surface coating composition with the optimum range being about 7.5–15% by weight. Increasing the density of the liquid portion is beneficial, as where the difference in density between the liquid and solid portions is small the tendency of the particles to settle out is reduced. Care must be exercised as to the type of halogenated hydrocarbon used so that the surface finish of the article to be coated will not be damaged by its solvent action.

This invention may be used in making any type surface coating composition desired where the composition contains a continuous non-aqueous liquid phase and a discontinuous liquid, solid, or liquid and solid phase to prevent excessive settling out of the discontinuous phase to the point where the discontinuous phase cannot be redispersed by simple agitation of the composition. Thus, this invention improves the redispersibility of such a product and also provides the consistency of a paste at a lower ratio of dispersed solids to continuous liquid phase.

The di-(n-octyl)ester of sodium sulfosuccinic acid is the preferred compound of the two sodium sulfosuccinic acid esters of this invention and is commonly known as "Anionic ON," a product made by American Cyanamid Company. The other ester, di-(2-p-tertiarybutylphenoxyethyl)ester of sodium sulfosuccinic acid, is commonly known as "Surface Active Agent BPE" and is also made by American Cyanamid Company.

When a halogenated hydrocarbon is used in the manner described above, it may be mixed in with a mixture of sodium sulfosuccinate and non-aqueous solvent and then the mixture added to the solvent-wax mixture or it may be introduced as a separate ingredient. In either case, it is preferred that the more volatile halogenated hydrocarbons be introduced beneath the liquid surface, and this is particularly true of Freon 114, with the liquid maintained at a temperature below 90° F. in order to prevent or at least minimize losses of the halogenated hydrocarbon due to evaporation.

The Freons that are usable in these compositions are fluoro-chloro-hydrocarbons such as Freon 113, which is trichlorotrifluoroethane, and Freon 114, which is dichlorotetrafluoroethane, made by E. I. du Pont de Nemours & Co. of Wilmington, Delaware.

The foregoing detailed description is given for clearness of understanding only and no unnecessary limitations should be understood therefrom as modifications will be obvious to those skilled in the art.

I claim:

1. A thixotropic substantially non-aqueous surface coating composition, consisting essentially of: a liquid phase including a non-aqueous solvent; a wax adapted to be deposited on a surface upon evaporation of the solvent after application of said composition to said surface; and about 0.1–10% by weight of the composition of a compound substantially insoluble at room temperature in said solvent having essentially the formula

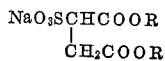

wherein R is a member of the class consisting of n-octyl and 2-p-tertiarybutylphenoxyethyl groups.

2. A thixotropic substantially non-aqueous surface coating composition, consisting essentially of: a liquid phase including a non-aqueous solvent; a wax adapted to be deposited on a surface upon evaporation of the solvent after application of said composition to said surface; and about 0.1–10% by weight of the composition of the di-(n-octyl)ester of sodium sulfosuccinic acid.

3. A thixotropic substantially non-aqueous surface coating composition, consisting essentially of: a liquid phase including a non-aqueous solvent; a wax adapted to be deposited on a surface upon evaporation of the solvent after application of said composition to said surface; and about 0.1–10% by weight of the composition of the di-(2-p-tertiarybutylphenoxyethyl)ester of sodium sulfosuccinic acid.

4. A thixotropic substantially non-aqueous surface coating composition, consisting essentially of: about 78 parts by weight of a non-aqueous solvent; about 0.75–7.25 parts by weight of a wax; and about 0.1–10% by weight of the composition of a compound substantially insoluble at room temperature in said solvent having essentially the formula

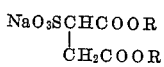

wherein R is a member of the class consisting of n-octyl and 2-p-tertiarybutylphenoxyethyl groups.

5. A thixotropic substantially non-aqueous surface coating composition, consisting essentially of: about 78 parts by weight of a non-aqueous solvent; about 0.75–7.25 parts by weight of a wax; and about 0.1–10% by weight of the composition of the di-(n-octyl)ester of sodium sulfosuccinic acid.

6. A thixotropic substantially non-aqueous surface coating composition, consisting essentially of: about 78 parts by weight of a non-aqueous solvent; about 0.75–7.25 parts by weight of a wax; and about 0.1–10% by weight of the composition of the di-(2-p-tertiarybutylphenoxyethyl)ester of sodium sulfosuccinic acid.

7. A thixotropic substantially non-aqueous surface coating composition, consisting essentially of: a liquid phase including a non-aqueous solvent; a wax adapted to be deposited on a surface upon evaporation of the solvent after application of said composition to said surface; up to about 20% by weight of the composition of trichlorotrifluoroethane; and about 0.1–10% by weight of the composition of a compound substantially insoluble at room temperature in said solvent having essentially the formula

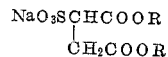

wherein R is a member of the class consisting of n-octyl and 2-p-tertiarybutylphenoxyethyl groups.

8. A thixotropic substantially non-aqueous surface coating composition, consisting essentially of: about 78 parts by weight of a non-aqueous solvent; about 0.75–7.25 parts by weight of a wax; about 7.5–15% by weight of the composition of trichlorotrifluoroethane; and about 0.1–10% by weight of the composition of a compound substantially insoluble at room temperature in said solvent having essentially the formula

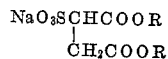

wherein R is a member of the class consisting of n-octyl and 2-p-tertiarybutylphenoxyethyl groups.

9. A thixotropic substantially non-aqueous surface coating composition, consisting essentially of: about 78 parts by weight of a non-aqueous solvent; about 0.75–7.25 parts by weight of a wax; about 7.5–15% by weight of the composition of trichlorotrifluoroethane; and about 0.1–10% by weight of the composition of a compound substantially insoluble at room temperature in said solvent having essentially the formula $$\underset{\underset{\text{CH}_2\text{COOR}}{|}}{\text{NaO}_3\text{SCHCOOR}}$$

wherein R is an n-octyl group.

10. A thixotropic substantially non-aqueous surface coating composition, consisting essentially of: about 78 parts by weight of a non-aqueous solvent; about 0.75–7.25 parts by weight of a wax; about 7.5–15% by weight of the composition of trichlorotrifluoroethane; and about 0.1–10% by weight of the composition of a compound substantially insoluble at room temperature in said solvent having essentially the formula $$\underset{\underset{\text{CH}_2\text{COOR}}{|}}{\text{NaO}_3\text{SCHCOOR}}$$

wherein R is a 2-p-tertiarybutylphenoxyethyl group.

References Cited in the file of this patent

UNITED STATES PATENTS

| | | |
|---|---|---|
| 2,028,091 | Jaeger | Jan. 14, 1936 |
| 2,561,816 | Pabst et al. | July 24, 1951 |